United States Patent
Asterjadhi et al.

(10) Patent No.: US 12,317,192 B2
(45) Date of Patent: *May 27, 2025

(54) POWER SAVE FOR MULTI-USER (MU) OPERATION

(71) Applicant: QUALCOMM Incorporated, San Diego, CA (US)

(72) Inventors: Alfred Asterjadhi, San Diego, CA (US); George Cherian, San Diego, CA (US); Abhishek Pramod Patil, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/417,694

(22) Filed: Jan. 19, 2024

(65) Prior Publication Data

US 2024/0236859 A1 Jul. 11, 2024

Related U.S. Application Data

(63) Continuation of application No. 18/069,153, filed on Dec. 20, 2022, now Pat. No. 11,917,547, which is a continuation of application No. 16/737,631, filed on Jan. 8, 2020, now Pat. No. 11,558,819.

(60) Provisional application No. 62/836,907, filed on Apr. 22, 2019, provisional application No. 62/790,091, filed on Jan. 9, 2019.

(51) Int. Cl.
*H04W 52/02* (2009.01)
*H04W 74/0816* (2024.01)

(52) U.S. Cl.
CPC ... *H04W 52/0245* (2013.01); *H04W 74/0816* (2013.01)

(58) Field of Classification Search
CPC .................. H04W 52/0246; H04W 74/0816
See application file for complete search history.

(56) References Cited

U.S. PATENT DOCUMENTS

| | | | |
|---|---|---|---|
| 10,021,722 | B2 | 7/2018 | Chun et al. |
| 11,558,819 | B2 | 1/2023 | Asterjadhi et al. |
| 11,917,547 | B2* | 2/2024 | Asterjadhi ............ H04W 74/06 |
| 2011/0090855 | A1 | 4/2011 | Kim |
| 2011/0286378 | A1 | 11/2011 | Kim et al. |
| 2012/0051335 | A1 | 3/2012 | Kimura et al. |
| 2016/0119881 | A1 | 4/2016 | Merlin et al. |
| 2016/0330757 | A1 | 11/2016 | Cherian et al. |
| 2020/0221385 | A1 | 7/2020 | Asterjadhi et al. |
| 2023/0121644 | A1 | 4/2023 | Asterjadhi et al. |

* cited by examiner

*Primary Examiner* — James P Duffy
(74) *Attorney, Agent, or Firm* — Patterson & Sheridan LLP

(57) ABSTRACT

Certain aspects of the present disclosure provide an apparatus for wireless communications. The apparatus generally includes a processing system configured to generate a frame for triggering transmission of a plurality of data units from a plurality of wireless nodes, a first interface configured to output the frame for transmission to the plurality of wireless nodes, and a second interface configured to obtain the plurality of data units after outputting the frame for transmission, wherein the plurality of data units have different lengths.

20 Claims, 11 Drawing Sheets

POWER SAVE FOR MULTI-USER (MU) OPERATION

CROSS-REFERENCE TO RELATED APPLICATIONS

This application is a continuation of U.S. Non-Provisional patent application Ser. No. 18/069,153, filed Dec. 20, 2022, which is a continuation of U.S. Non-Provisional patent application Ser. No. 16/737,631, filed Jan. 8, 2020, which claims priority to U.S. Provisional Patent Application Ser. No. 62/790,091, filed Jan. 9, 2019, and U.S. Provisional Patent Application Ser. No. 62/836,907, filed Apr. 22, 2019, all of which are expressly incorporated herein by reference in their entirety.

FIELD

Certain aspects of the present disclosure generally relate to wireless communications and, more particularly, to multi-user (MU) communication.

BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has emerged as a popular technique for communication systems. MIMO technology has been adopted in several wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

SUMMARY

Certain aspects provide an apparatus for wireless communication. The apparatus generally includes a processing system configured to generate a frame for triggering transmission of a plurality of data units from a plurality of wireless nodes, a first interface configured to output the frame for transmission to the plurality of wireless nodes, and a second interface configured to obtain the plurality of data units after outputting the frame for transmission, wherein the plurality of data units have different lengths.

Certain aspects provide an apparatus for wireless communication. The apparatus generally includes a first interface configured to obtain a frame for triggering a transmission of a data unit and an indication of a common length of a plurality of data units, a processing system configured to determine whether to use a length of the data unit that is less than the common length, and generate the data unit in response to obtaining the frame, the length of the data unit being based on the determination, and a second interface configured to output the data unit for transmission.

Certain aspects provide a method for wireless communication. The method generally includes generating a frame for triggering transmission of a plurality of data units from a plurality of wireless nodes, outputting the frame for transmission to the plurality of wireless nodes, and obtaining the plurality of data units after outputting the frame for transmission, wherein the plurality of data units have different lengths.

Certain aspects provide a method for wireless communication. The method generally includes obtaining a frame for triggering a transmission of a data unit and an indication of a common length of a plurality of data units, determining whether to use a length of the data unit that is less than the common length, generating the data unit in response to obtaining the frame, the length of the data unit being based on the determination, and outputting the data unit for transmission.

Certain aspects provide an apparatus for wireless communication. The apparatus generally includes means for generating a frame for triggering transmission of a plurality of data units from a plurality of wireless nodes, means for outputting the frame for transmission to the plurality of wireless nodes, and means for obtaining the plurality of data units after outputting the frame for transmission, wherein the plurality of data units have different lengths.

Certain aspects provide an apparatus for wireless communication. The apparatus generally includes means for obtaining a frame for triggering a transmission of a data unit and an indication of a common length of a plurality of data units, means for determining whether to use a length of the data unit that is less than the common length, means for generating the data unit in response to obtaining the frame, the length of the data unit being based on the determination, and means for outputting the data unit for transmission.

Certain aspects provide an access point (AP). The AP generally includes at least one antenna, a processing system configured to generate a frame for triggering transmission of a plurality of data units from a plurality of wireless nodes, a first interface configured to output the frame for transmission to the plurality of wireless nodes via the at least one antenna, and a second interface configured to obtain, via the at least one antenna, the plurality of data units after outputting the frame for transmission, wherein the plurality of data units have different lengths.

Certain aspects provide a station. The station generally includes at least one antenna, a first interface configured to obtain, via the at least one antenna, a frame for triggering a transmission of a data unit and an indication of a common length of a plurality of data units, a processing system configured to determine whether to use a length of the data unit that is less than the common length, and generate the data unit in response to obtaining the frame, the length of the data unit being based on the determination, and a second interface configured to output the data unit for transmission via the at least one antenna.

Certain aspects provide an apparatus for wireless communication. The apparatus generally includes a processing system configured to generate a multi-user (MU) packet comprising one or more data units, wherein a length of at least one data unit of the one or more data units is less than an advertised length of the at least one data unit, the at least data unit indicating the advertised length, a first interface configured to output the MU packet for transmission to a plurality of wireless nodes, and a second interface configured to obtain, from the plurality of wireless nodes, one or more packets having one or more acknowledgement frames, each of the one or more acknowledgement frames indicating whether a respective data unit of the one or more data units was successfully decoded.

Certain aspects provide a method for wireless communication. The method generally includes generating a multi-user (MU) packet comprising one or more data units, wherein a length of at least one data unit of the one or more data units is less than an advertised length of the at least one data unit, the at least data unit indicating the advertised length, outputting the MU packet for transmission to a plurality of wireless nodes, and obtaining, from the plurality of wireless nodes, one or more packets having one or more acknowledgement frames, each of the one or more acknowledgement frames indicating whether a respective data unit of the one or more data units was successfully decoded.

Certain aspects provide an apparatus for wireless communication. The apparatus generally includes means for generating a MU packet comprising one or more data units, wherein a length of at least one data unit of the one or more data units is less than an advertised length of the at least one data unit, the at least data unit indicating the advertised length, means for outputting the MU packet for transmission to a plurality of wireless nodes, and means for obtaining, from the plurality of wireless nodes, one or more packets having one or more acknowledgement frames, each of the one or more acknowledgement frames indicating whether a respective data unit of the one or more data units was successfully decoded.

Certain aspects provide an AP. The AP generally includes at least one antenna, a processing system configured to generate a multi-user (MU) packet comprising one or more data units, wherein a length of at least one data unit of the one or more data units is less than an advertised length of the at least one data unit, the at least data unit indicating the advertised length, a first interface configured to output the MU packet for transmission to a plurality of wireless nodes via the at least one antenna, and a second interface configured to obtain, from the plurality of wireless nodes via the at least one antenna, one or more packets having one or more acknowledgement frames, each of the one or more acknowledgement frames indicating whether a respective data unit of the one or more data units was successfully decoded.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
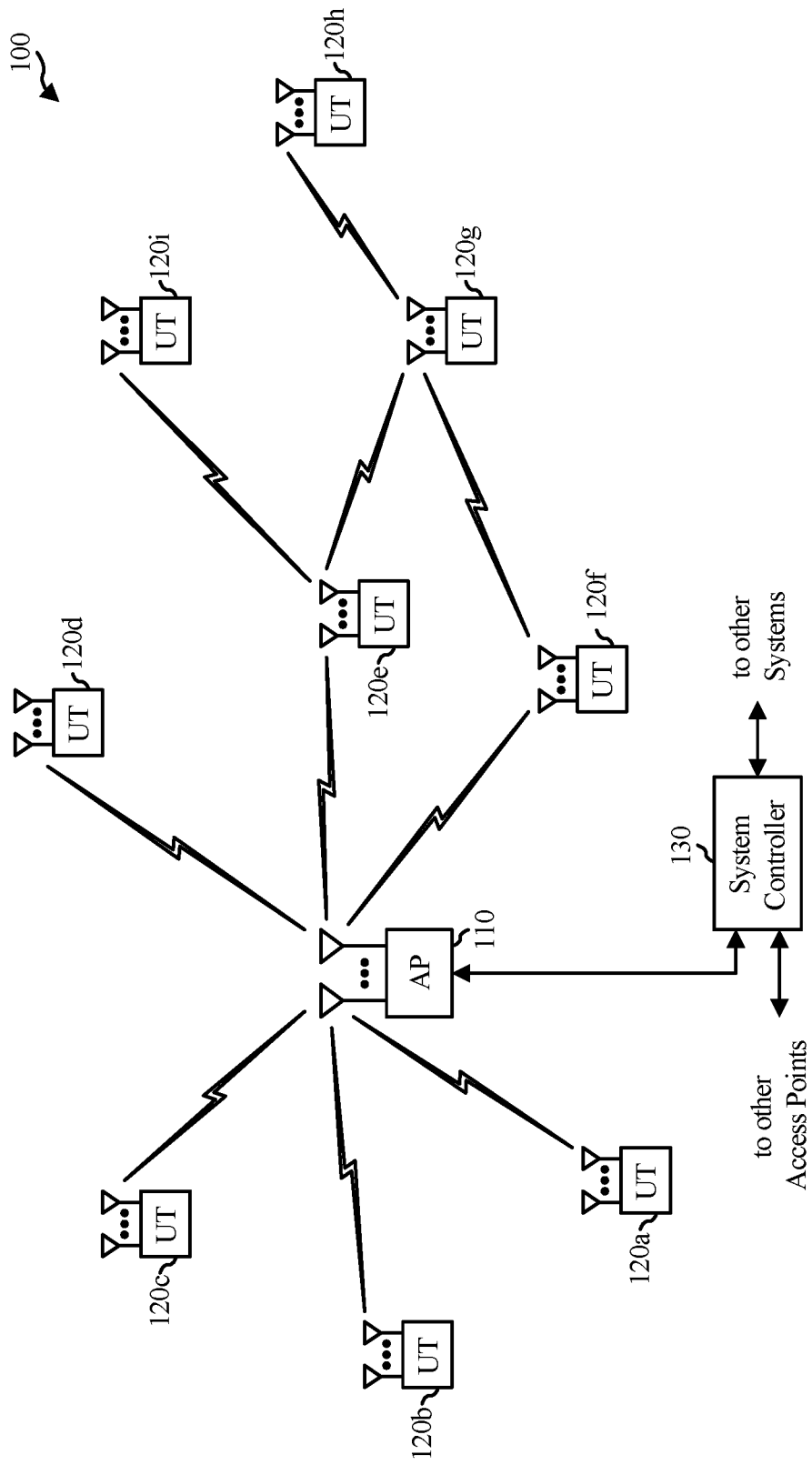
FIG. 1 is a diagram of an example wireless communications network, in accordance with certain aspects of the present disclosure.

Certain aspects of the present disclosure generally relate to wireless communications and, more particularly, to frame structures and protocols for uplink (UL) multiple user (MU) frame exchanges. Certain aspects provide protocol rules and efficient frame exchange sequences to enable sending multiple block acknowledgments (BAs) in UL and/or downlink (DL) MU multiple-input multiple-output (MIMO) and frequency division multiple access (FDMA) systems. According to certain aspects, a multi-STA BA request (BAR) frame may simultaneously solicit multiple immediate BAs. According to certain aspects, frame exchange sequences involve special subframes and/or reverse direction grants (RDGs).

Various aspects of the disclosure are described more fully hereinafter with reference to the accompanying drawings. This disclosure may however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The acronyms listed below may be used herein, consistent with commonly recognized usages in the field of wireless communications. Other acronyms may also be used herein, and if not defined in the list below, are defined where first appearing herein.

ACK . . . Acknowledgement
A-MPDU . . . Aggregated Media Access Control Protocol Data Unit
AP . . . Access Point
BA . . . Block ACK
BAR . . . Block ACK Request
CRC . . . Cyclic Redundancy Check
DIFS . . . Distributed Interframe Space
EOF . . . End of Frame
EIFS . . . Extended Interframe Space
FCS . . . Frame Check Sequence
ID . . . Identifier
IEEE . . . Institute of Electrical and Electronic Engineers
LTF . . . Long Training Field
MAC . . . Media Access Control
MSB . . . Most Significant Bit
MIMO . . . Multiple Input Multiple Output
MPDU . . . MAC Protocol Data Unit
MU . . . Multi-User
MU-MIMO . . . Multi-User Multiple Input Multiple Output
NDP . . . Null Data Packet
OFDM . . . Orthogonal Frequency Division Multiplexing
OFDMA . . . Orthogonal Frequency Division Multiple Access
PHY . . . Physical Layer
PLCP . . . Physical Layer Convergence Protocol
PPDU . . . PLCP Protocol Data Unit
PSDU . . . PLCP Service Data Unit
QoS . . . Quality of Service
RDG . . . Reverse Direction Grant
S1G . . . Sub-1-GHz
SDMA . . . Spatial-Division Multiple Access
SIFS . . . Short Interframe Space
SIG . . . Signal
STA . . . Station
STBC . . . Space-Time Block Coding
STF . . . Short Training Field
SU . . . Single User
TCP . . . Transmission Control Protocol
VHT . . . Very High Throughput
WLAN . . . Wireless Local Area Network The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

An Example Wireless Communication System

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer or future user terminals being implemented with technology such as SDMA, OFDM or OFDMA to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
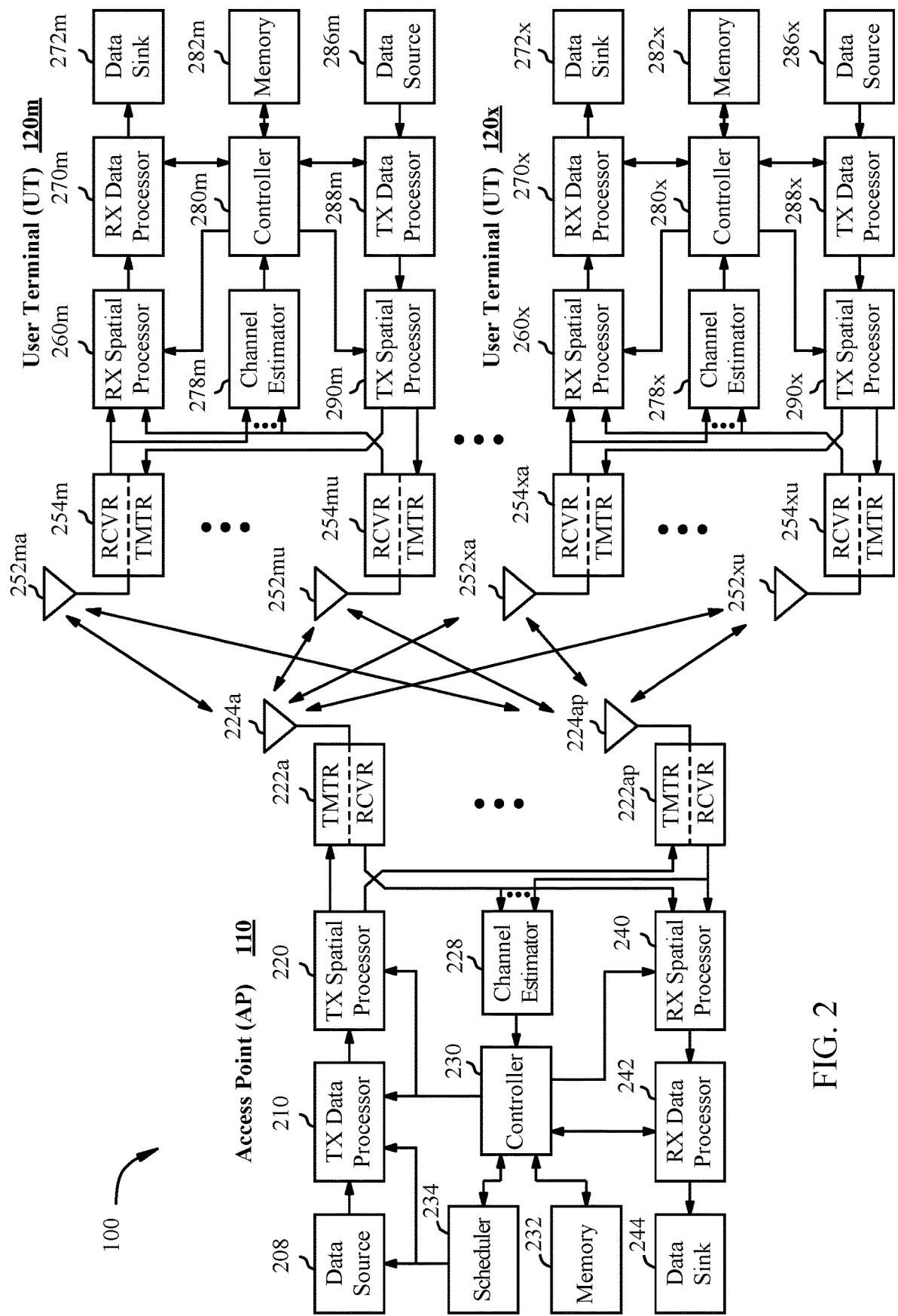
FIG. 2 is a block diagram of an example access point and example user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with N antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ up user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal.

$N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
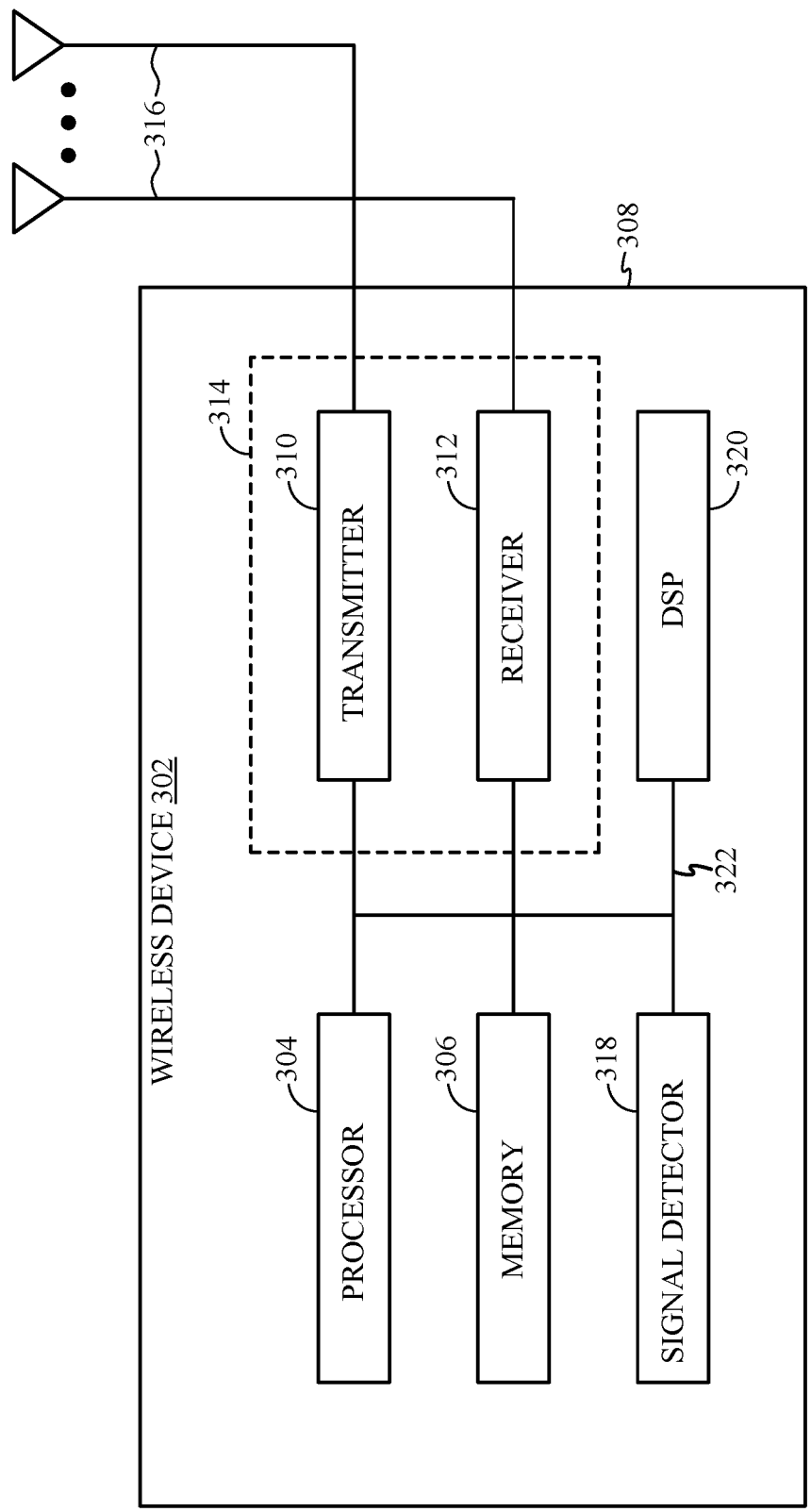
FIG. 3 is a diagram illustrating signal propagation in an implementation of phased-array antennas, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Techniques for Multi-User (MU) Communication

Multi-user (MU) operation has been introduced to increase throughput and range, and reduce latency and overhead. MU operation relies on frequency/space multiplexing of data from multiple stations or to multiple stations. MU multiplexing may be referred to as uplink (UL) MU, if the data generated by multiple stations is directed to an AP. MU multiplexing may be referred to as downlink (DL) MU, if the data generated by the AP is directed to multiple stations. In a more generic case, the data may be multiplexed from multiple stations and directed to multiple other stations. UL MU operations are described below, however, all of the aspects described herein may be applicable to other combinations as well. In certain aspects, the data from each of the multiple stations are delivered to an access point (AP) within the same amount of transmit times, and within reduced bandwidth resource units as compared to single user (SU) transmissions. Certain aspects of the present disclosure provide techniques for MU operations with reduced power consumption as compared to conventional techniques.

An UL MU sequence includes an AP sending a trigger frame to multiple stations, and the stations responding with a trigger based (TB) data unit (e.g., a physical layer convergence protocol (PLCP) protocol data unit (PPDU)). From a station's perspective, the station responds to the trigger frame with an HE TB PPDU (also referred to herein as a data unit). The HE TB PPDU contains a PHY header and a data field, with the data field containing a service field and a PLCP service data unit (PSDU). The PSDU may include an aggregated medium access control (MAC) protocol data unit (A-MPDU). From the AP's perspective, the AP receives one or more HE TB PPDUs, which contain the same PHY header content, and different data fields.

An A-MPDU contains one or more MAC protocol data units (MPDUs), each of which is preceded by an MPDU delimiter. The MPDU delimiter contains the length of a following MPDU and an end of frame (EOF) field that indicates an end of the frame. The MPDU delimiter may have a length value of zero when the corresponding A-MPDU subframe does not contain an MPDU (e.g., the MPDU delimiter is used as padding). The MPDU delimiter may have a nonzero length value when the corresponding A-MPDU subframe does contain an MPDU. The EOF field may be set to one in a nonzero length MPDU delimiter to indicate that the corresponding A-MPDU subframe is the last A-MPDU subframe that contains an MPDU for a traffic identifier (TID) in the A-MPDU. The EOF field may be set to one in a zero length MPDU delimiter to indicate the end of the frame (e.g., that there will be no more nonzero length MPDUs for the remainder of the A-MPDU).

In certain aspects, the data units of all stations end at the same time, independent of the amount of data each station is transmitting. After receiving the data unit from each of the stations, the AP acknowledges reception of the data units by transmitting acknowledgments to the one or more stations The acknowledgments may be part of one or more acknowledgement frames, block acknowledgement (BA) frames, or multi-station BA (M-BA) frames. If more than one frame is transmitted for the acknowledgement, then the frames may be multiplexed in frequency.

The duration (also referred to herein as "length") of the data units may be determined by the AP (in part) based on the buffer status reports that the AP has received from all the stations. The duration of the data units is indicated to the stations in the trigger frame that is addressed to the stations and that triggers the stations to send their data. For example, the AP may set the duration of the data units to accommodate the station having the most data buffered for transmission. This particular station may generate an A-MPDU, which is included in the TB PPDU and which contains multiple MPDUs and a certain amount of padding (e.g., in the form of MPDU delimiters with zero length) to ensure that the duration of the TB PPDU is equal to the duration specified by the AP in the trigger frame that is soliciting the data. The station may include padding for multiple reasons. For example, the allocated resources specified in the trigger frame may not be precise enough for the station to only include MPDUs and their respective delimiters, or the station may not be capable of generating (or the AP may not be capable of receiving) MPDUs at the rate being solicited. Thus, the station pads the A-MPDU to gain processing time (in transmit or in receive) between subsequent MPDUs.

Similarly, other stations may not have enough UL data to fill their corresponding data units with useful data (e.g., MPDUs that are preceded by nonzero length MPDU delimiters), and as such may include an increased number of zero length MPDU delimiters so that the TB PPDU ends at the time specified by the trigger frame, leading to increased power consumption. In other words, regardless of the amount of data each station has to transmit, the length of the data units from all stations may have the same length, in accordance with the length indicated by the AP in the trigger frame. Certain aspects of the present disclosure are generally directed to techniques for reducing power consumption of stations by allowing early termination of data units transmitted by the stations. As used herein, the term "early termination of data units" may refer to a station terminating its data units earlier than the duration specified by the trigger frame. For example, the station may not include padding, such as zero length MPDU delimiters, to the TB PPDU. This may result in the duration of the TB PPDU being less than the duration specified by the trigger frame, and the duration of the TB PPDUs transmitted by multiple stations to be different.

Figure 4:
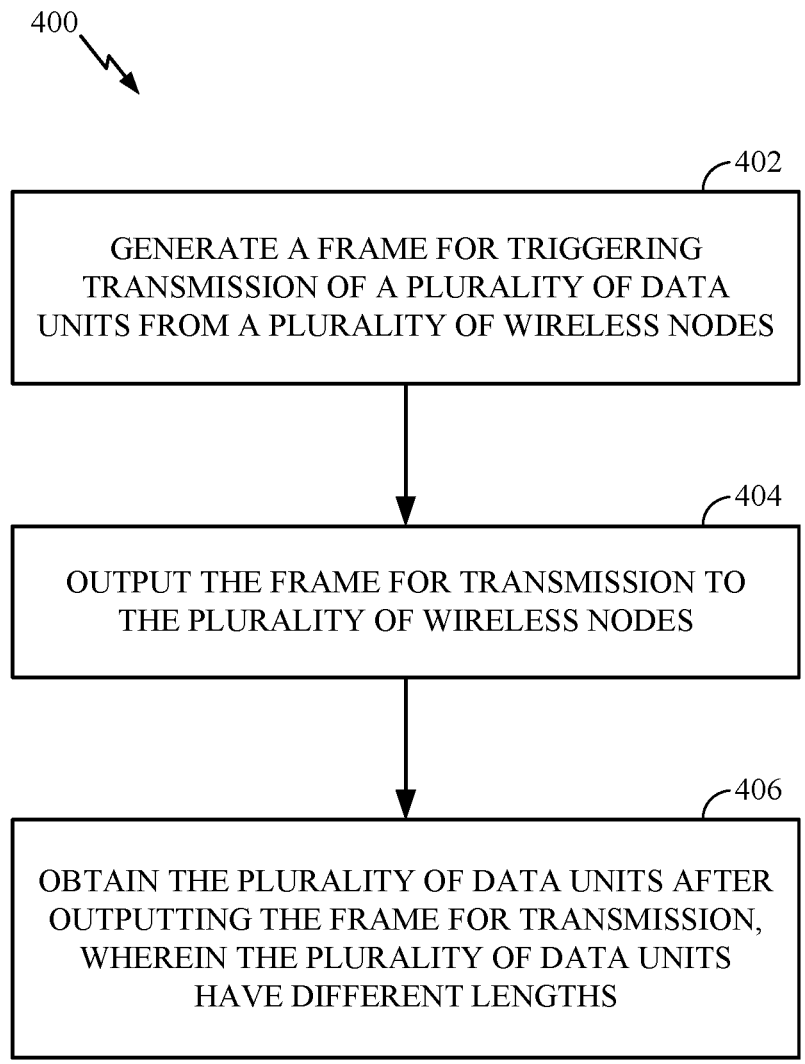
FIG. 4 illustrates example operations for wireless communication, in accordance with certain aspects of the present disclosure.

FIG. 4 is a flow diagram illustrating example operations 400 for wireless communication, in accordance with certain aspects of the present disclosure. The operations 400 may be performed by an apparatus, such as the AP 110.

The operations 400 begin, at block 402, by generating a frame for triggering transmission of a plurality of data units from a plurality of wireless nodes. At block 404, the apparatus outputs the frame for transmission to the plurality of wireless nodes. At block 406, the apparatus obtains the plurality of data units after outputting the frame for transmission. In certain aspects, the plurality of data units has different lengths. The length of each of the data units may be determined by a respective station based on the amount of data to be included in the data unit by the station, if the station is allowed to early terminate the data unit, as described in more detail herein. The lengths of the data units may be in any suitable unit, such as in octets, or OFDM symbols. For example, the IEEE 802.11ax standard and next generation standards, such as Extreme High Throughput (EHT), may specify the length in OFDM symbols.

Figure 5:
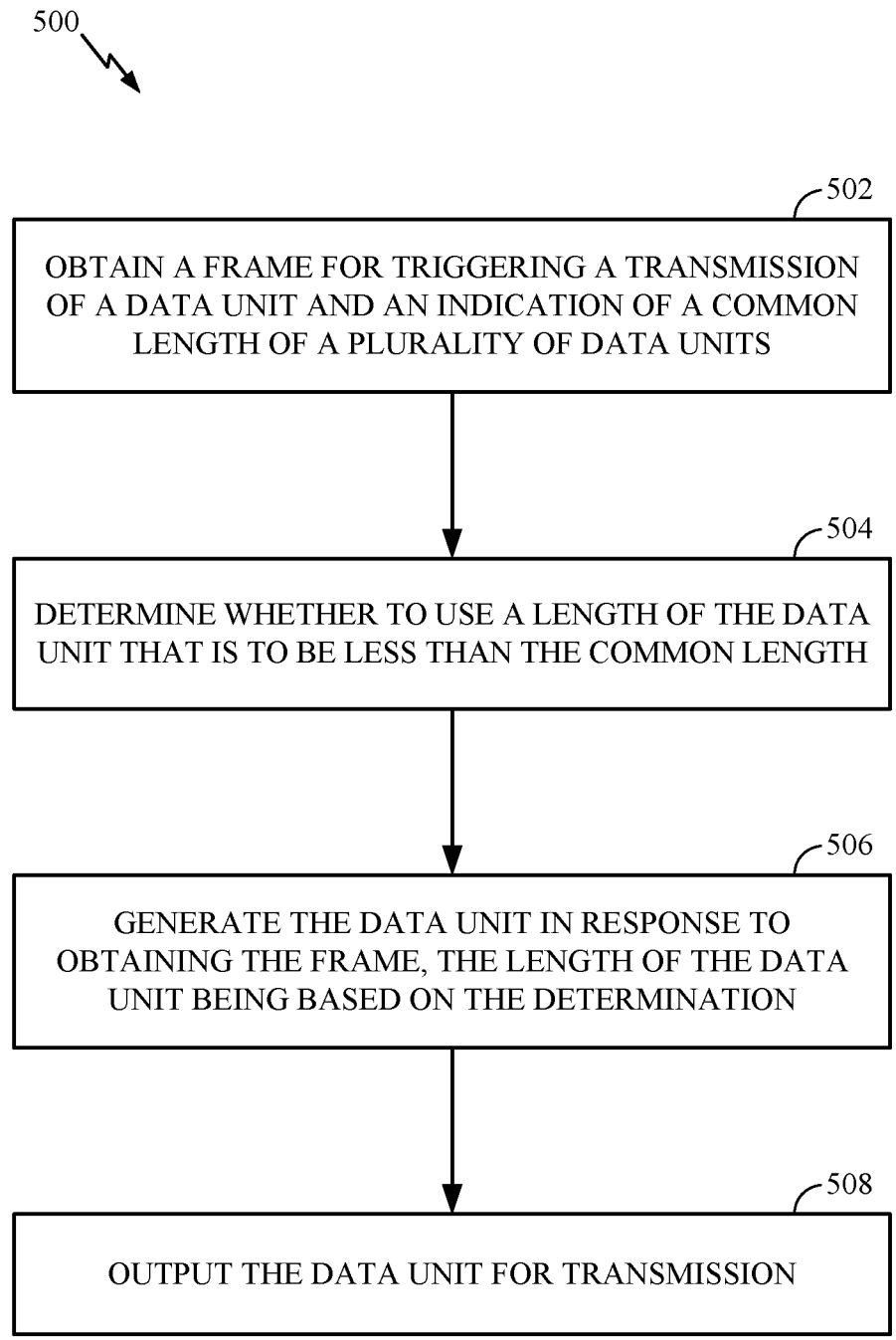
FIG. 5 illustrates example operations for wireless communication, in accordance with certain aspects of the present disclosure.

FIG. 5 is a flow diagram illustrating example operations 500 for wireless communication, in accordance with certain aspects of the present disclosure. The operations 500 may be performed by an apparatus, such as a station (e.g., user terminal 120).

The operations 500 begin, at block 502, by obtaining a frame for triggering a transmission of a data unit and an indication of a common length of a plurality of data units. At block 504, the apparatus determines whether to use a length of the data unit that is less than the common length, and at block 506, generates the data unit in response to obtaining the frame, the length of the data unit being based on the determination. For example, the apparatus may determine the length of the data unit based on the amount of data to be included in the data unit, if the apparatus is allowed to early terminate the data unit, as described in more detail herein. At block 508, the apparatus outputs the data unit for transmission. In other words, to reduce the power consumption of stations, one or more of the stations may be allowed to terminate the transmission of their respective data units early, as will be described in more detail with respect to FIG. 6.

Figure 6:
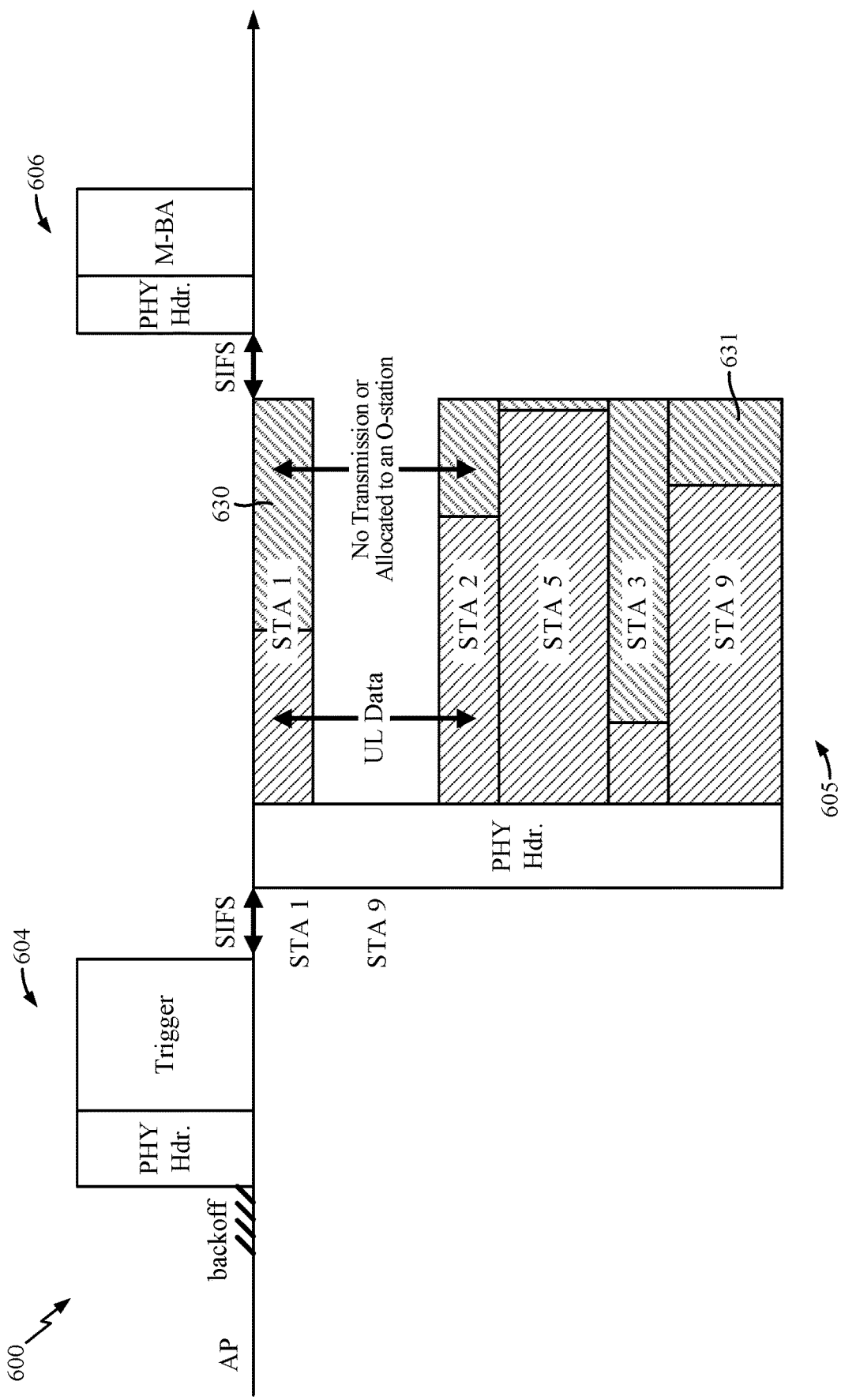
FIG. 6 is a communication protocol for multi-user (MU) communication, in accordance with certain aspects of the present disclosure.

FIG. 6 is a communication protocol 600 for MU communication, in accordance with certain aspects of the present disclosure. As illustrated, the AP may transmit a trigger frame 604 that triggers the transmission of the data units 605 from one or more stations. As illustrated, the UL data in one or more of the data units 605 may be terminated early. For example, stations 1, 2, 3, 5, and 9 do not transmit during a portion (e.g., portion 631) of the transmit opportunity allocated for the data units, as illustrated.

In certain aspects, even if a station is terminating a data unit early, the station may still indicate, in the data unit, a length of the data unit as if the data unit is not terminated early so that stations from other basic service sets (BSSs) may set their network allocation vectors (NAVs) accordingly. The length of the data unit may be in the PHY header of the TB PPDU (data unit). For example, the length may be specified in a common portion of the PHY header that may have the same value across all stations, and as such, even if a station terminates its data unit early, the station may still indicate the same information for the length as specified by the trigger frame.

In certain aspects, the stations may indicate to the AP when their respective data units end to aid the AP in the decoding process of the UL data contained in the TB PPDU and prepare for generating the acknowledgment of the received data units, which in certain aspects may involve generating a bit map for acknowledging the one or more data units via the M-BA 606. For example, an EOF field in one or more MPDU delimiters contained in each of the data units may be set (e.g., to logic high) to indicate the end of the data unit. Each station may terminate a respective data unit immediately after the first EOF MPDU subframe at the boundary of the symbol that contains the last EOF MPDU subframe. This EOF MPDU subframe may have a zero length.

The early termination of data units by the stations may result in power variations (e.g., power drop) of the signaling from the stations, which may be less than a receive power requirement of the AP (e.g., due to automatic gain control (AGC) at the AP). Thus, the AP may select only a subset of the stations for early termination. In certain aspects, only a subset of the stations that satisfy certain conditions may early terminate their data units. For example, the AP may indicate which of (or whether) the stations are allowed to early terminate their respective data units via an operation information element (IE) (e.g., high-efficiency (HE) operation IE or EHT operation IE), via a common field of the trigger frame addressed to all the stations being triggered, or via per user information fields of the trigger frame addressed to respective stations. If using the per user information fields, each per user information field may indicate whether the corresponding station, to which the field is addressed, is allowed to early terminate.

In certain aspects, the AP may determine which stations are allowed to early terminate their respective data units based on a characteristic (e.g., remaining battery power) of the stations. For example, each of the stations may indicate one or more parameters indicating the characteristic of the station, such that the AP may determine which stations are most suitable for early termination. For instance, the AP may allow the stations with the least battery power to early terminate to facilitate power saving for those stations.

The aspects described herein for early termination are especially beneficial in target wake time (TWT) operation mode where the listen time of stations is relatively less than other operating modes. However, the aspects described herein may be used in any suitable operation mode, power save mode, or active mode.

In certain aspects, the determination of whether to early terminate may be made by the station. For example, the station may determine the minimum receive power requirement of the AP via the transmit power and target receive signal strength indicator (RSSI) information provided by the AP in the trigger frame, and only early terminate if the station determines that early termination would not cause the signaling of the data units to be received at the AP with a receive power that is less than the minimum receive power requirement of the AP. For instance, the AP may indicate a tolerable power drop from a total receive power expected at the AP. The total receive power expected at the AP may correspond to a sum of target RSSIs for all stations, which may be indicated in the per user information fields of the trigger frame. For instance, each station may sum the RSSIs for all stations (e.g., stations 1-9 of FIG. 6), and determine whether the station can early terminate a respective data unit, assuming a worst case where all other stations also early terminate their respective data units. In certain aspects, the AP may advertise the list of stations that may early terminate in management frames the AP transmits so that the station can have a more precise indication of which other stations may early terminate.

If all stations in a particular sub-channel early terminate their respective data units, stations from other basic service sets (BSSs) (also referred to as "OBSS stations") may communicate during the channel since they may sense the channel being idle. This may occur if the OBSS station has not received the trigger frame sent by AP, and thus, has not set its network allocation vector (NAV). A NAV is used by stations to defer transmissions for a duration to avoid interfering with other stations. The OBSS stations may also communicate during the channel if the OBSS station is a legacy station that does not understand HE SIG-A (or the transmit opportunity duration field in the HE SIG-A is set to unspecified), and thus, does not set its NAV accordingly. The OBSS stations may also communicate during the channel if the OBSS station did not receive the HE SIG-A portion of the data units. To mitigate these issues, the AP may only allow the early termination operations described herein in the 6 GHz band in which legacy stations do not communicate. In certain aspects, the AP may precede the MU sequences with a request to send (RTS)/clear to send (CTS) sequence, CTS-to-self or MU RTS/CTS, in order for the legacy stations to set their respective NAVs.

In certain aspects, a station may signal its intent to early terminate TB PPDUs by setting a capability bit. For instance, the station may set the capability bit, such as an early TB PPDU termination support bit, to 1 to indicate the station's intent to early terminate TB PPDUs. This type of signaling may generally be considered static since the station may not change its capabilities once it is associated with an access point or a peer station. The capability bit, such as the early TB PPDU termination support bit, may be included in a capabilities element, such as a high efficiency (HE) capabilities element, extreme high-throughput (EHT) capabilities element, or extended capabilities element, transmitted by the station.

In certain aspects, a station may signal its intent to early terminate TB PPDUs by setting an operation bit. For instance, the station may set the operation bit, such as an early TB PPDU termination bit, to 1 to indicate the station's intent to early terminate TB PPDUs. This type of signaling may generally be considered dynamic since the station may dynamically switch the bit from 0 to 1 depending on its operation requirements. The operation bit, such as the early TB PPDU termination bit, may be included in the MAC header of frames that the STA transmits to an AP or the peer STA. In certain aspects, the operation bit, such as the early TB PPDU termination bit, may be included in an uplink (UL) power headroom (UPH) control field of an A-Control field sent by the station.

In certain aspects, a STA may additionally indicate to the AP a maximum duration of a TB PPDU that the STA may generate in response to a received trigger frame without early terminating the TB PPDU. For example, the station may indicate that a respective data unit of the station will have a maximum duration of 1 ms. Once the maximum duration is exceeded, the station may terminate the TB PPDU. An AP that receives such indication(s) from a STA may be able to use this information to manage the early termination of various stations. For example, the AP may ensure that resource units (RUs) allocated in trigger frames that are sent to stations that have indicated that they may early terminate their respective data units are grouped with another station that does not perform early PPDU termination. For example, the AP may ensure that at least one RU in each subchannel (e.g., 20 MHz subchannel) is occupied for the whole duration of the TB PPDU by the transmission of at least one STA. The AP may also ensure that STAs are grouped with other STAs in such a way that impact to the AP's AGC is reduced, as described in more detail herein.

In some aspects, the AP may ensure that TB PPDUs solicited with a trigger frame do not exceed the maximum duration that is indicated by the STAs that are the intended receivers of the trigger frame. In other aspects, the AP may allocate a set duration (e.g., 3 ms) to the STAs, and allow the STAs to early terminate (e.g., after 1 ms) their respective PPDUs depending on the amount of data each STA has to transmit in a respective PPDU.

Early termination of PPDUs may result in the availability of resources that may be used by other STAs (e.g., available resources 630 in FIG. 6). For example, an AP may allocate the remainder of an RU (e.g., available resources 630) to an opportunistic station (O-station) after a station (e.g., STA1 in FIG. 6) to which the RU is allocated (referred to herein as the designated station) early terminates a respective PPDU. For instance, when the AP knows that the designated station is going to early terminate a respective PPDU to be transmitted in a RU, the AP may allocate the available resources due to the early termination to another station, or O-station. In some cases, the AP may allocate the available resources of the RU to be randomly accessed by STAs.

In certain aspects, an AP may transmit an indication to the O-station, the indication allocating the available resources to the O-station. For example, the indication of the allocation to the O-station may be in a user information field of the trigger frame (e.g., trigger frame 604). The user information field may be addressed to the O-station.

In certain aspects, the O-station may decode the last OFDM symbol of the TB PPDU that is transmitted in the resource that is allocated to the O-station from the designated station prior to transmission. For example, the AP may indicate via the user information field that the O-station is to decode the last OFDM symbol (e.g., having an EOF field set to one in a zero length MPDU delimiter to indicate the end of the frame) of the data unit from the designated station prior to the transmission by the O-station via the allocated resources. In certain aspects, the designated station's (e.g., STA 1 in FIG. 6) transmit parameters may be included in a user information field that indicate the same RU location. Alternatively or additionally, the designated station's transmit parameters may be included in a user information field that allocates resources which are the same or that are a superset of the resources allocated to the O-station. The transmit parameters may enable the O-station to decode the last OFDM symbol to determine when to begin transmission.

In certain aspects, the user information field may also contain an indication of where the last OFDM symbol is, allowing the O-station to know when to begin transmission via the available resources without actually decoding the last symbol of the data unit from the designated station. The O-station may begin sending training fields (e.g., short training field (STF)/long training fields (LTFs)) and its data field(s) immediately after the last OFDM symbol. The O-station may ensure that each of the STF and N LTFs (N being an integer equal to or greater than 1) have the same duration as OFDM data symbols of the data unit. The O-station may also ensure that the PPDU terminates at the same time as other TB PPDUs transmitted by the stations. In certain aspects, the AP may indicate to the designated station to terminate a respective PPDU with a post-amble. The post-amble may be decoded by the O-station, helping to identify the termination of the preceding PPDU, prior to the transmission by the O-station (e.g., to synchronize and perform pre-correction).

Figure 7:
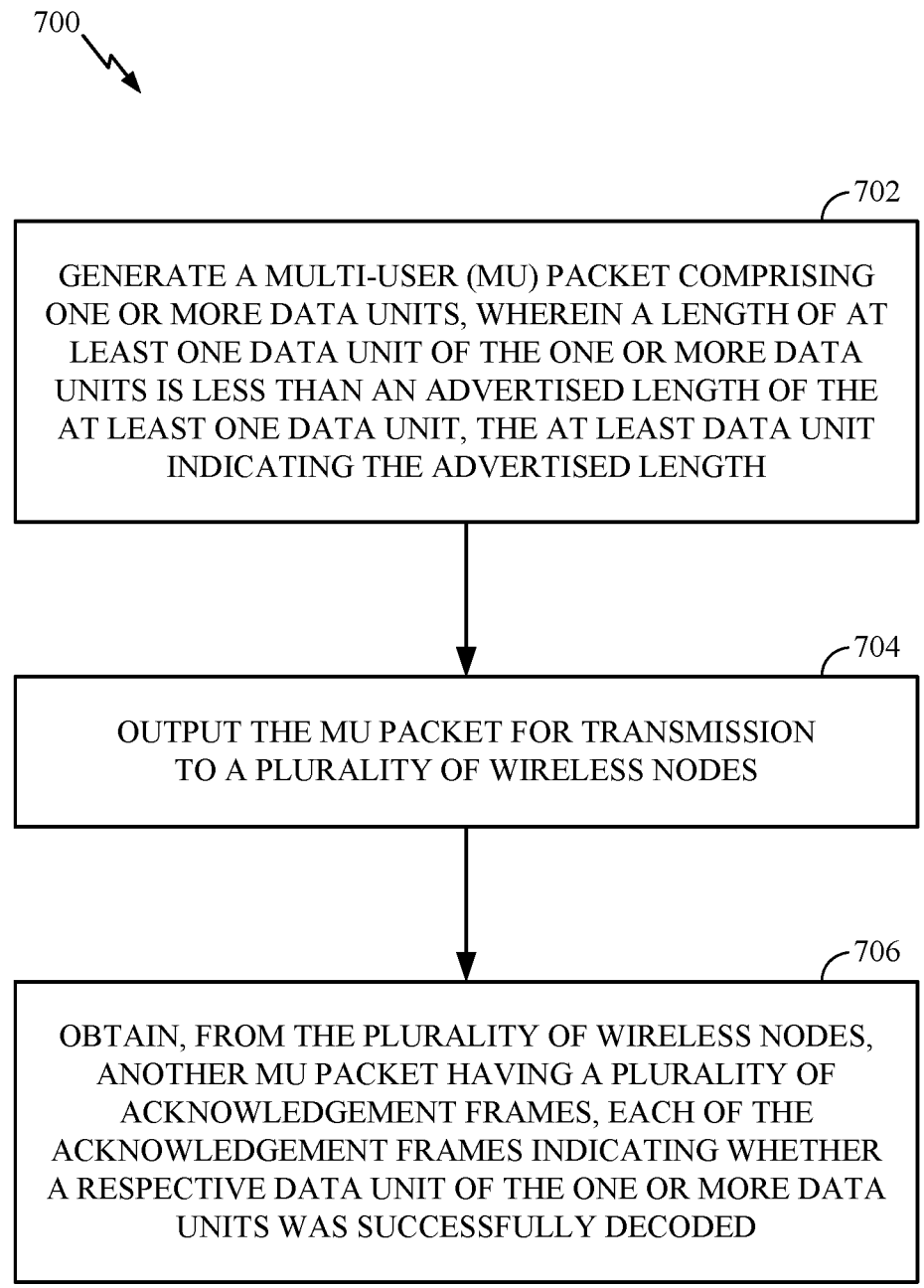
FIG. 7 example operations for wireless communication, in accordance with certain aspects of the present disclosure.

FIG. 7 is a flow diagram illustrating example operations 700 for wireless communication, in accordance with certain aspects of the present disclosure. The operations 700 may be performed via an AP, such as the AP 110.

The operations 700 begin, at block 702, by generating an MU packet comprising one or more data units. In certain aspects, a length (e.g., actual length as transmitted) of at least one data unit of the one or more data units is less than an advertised length of the at least one data unit, the at least data unit indicating the advertised length. In certain aspects, the one or more data units may include a plurality of data units having different lengths (e.g., actual lengths as transmitted). At block 704, the MU packet is output for transmission to a plurality of wireless nodes. At block 706, the AP may obtain, from the plurality of wireless nodes, one or more packets having a plurality of acknowledgement frames, each of the acknowledgement frames indicating whether a respective data unit of the one or more data units was successfully decoded.

Figure 8:
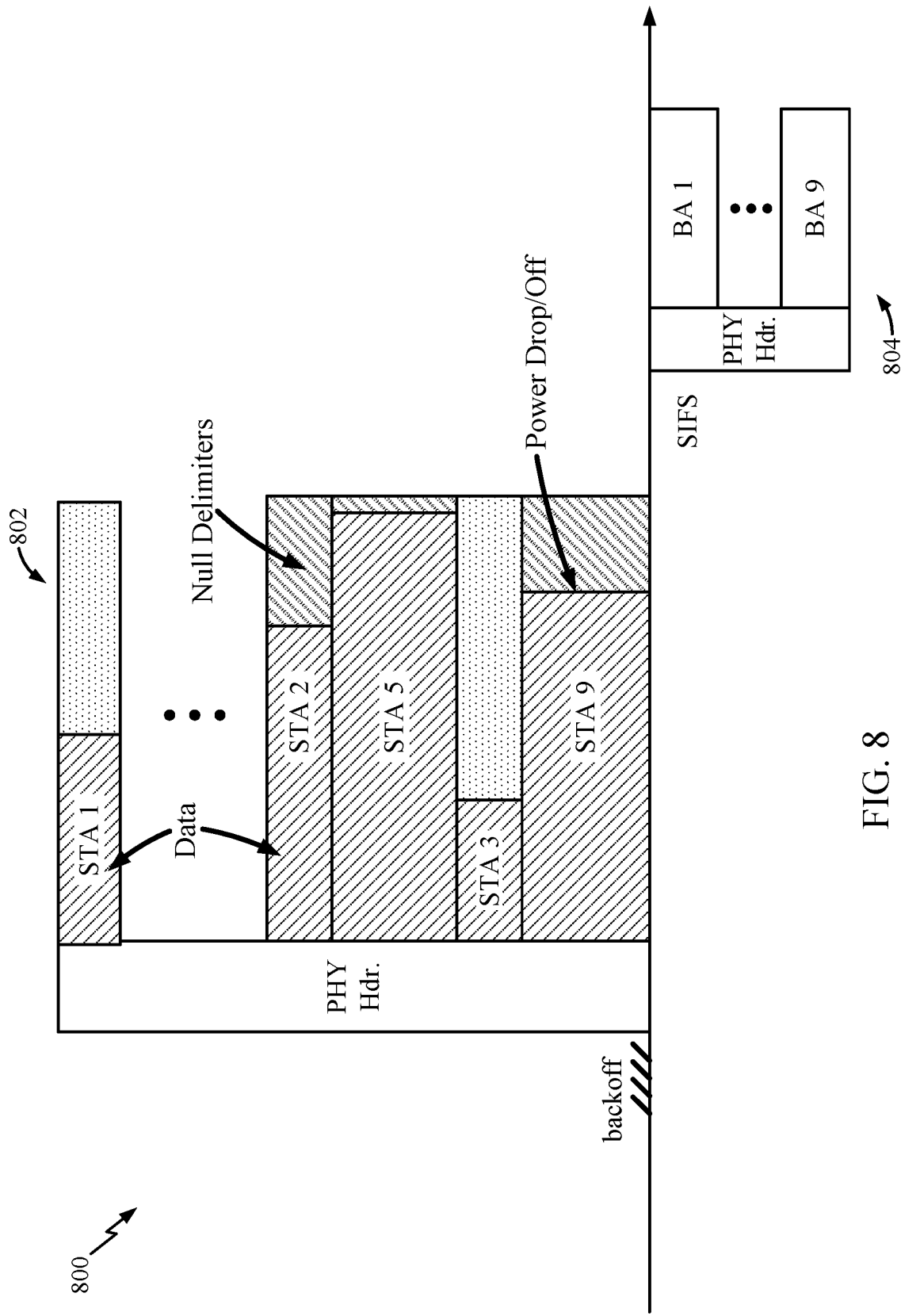
FIG. 8 is a communication protocol for MU communication, in accordance with certain aspects of the present disclosure.

FIG. 8 is a communication protocol 800 for MU communication, in accordance with certain aspects of the present disclosure. As illustrated, the AP may transmit an MU packet having data units for various stations. The data units of the MU packet may have different lengths. That is, one or more of the data units may be early terminated, as described herein, after the last OFDM symbol containing useful data. The AP may not include non-EOF null delimiters (or at least no more than necessary) after the last OFDM symbol. In certain aspects, a station that is the recipient of a PSDU may terminate reception (e.g., decoding) after the first EOF null delimiter indicating the end of the PSDU. Early termination of reception may be performed even if the AP does not early terminate the PSDU. Benefits of early termination of downlink PPDUs include reduced power consumption (e.g., important for mobile APs) and power distribution in different RUs of the PPDU. For example, if the PSDU for one station is early terminated, transmit power may be increased to another station.

In certain aspects, after the AP early terminates the one or more data units, the AP may use the available resources due to the early termination to transmit data to one or more O-stations. In other words, an AP may send a downlink MU PPDU, and at the point in time at which the AP early terminates each data unit for a particular station, the AP may begin transmitting a data unit for another station (e.g., O-station).

Certain aspects are generally directed to early termination of PPDUs across multiple APs which may be used for coordinated beamforming, coordinated OFDMA, distributed MU MIMO, and coordinated spatial reuse. For example, multiple APs may coordinate transmissions to stations and the transmissions may be multiplexed across time, frequency, or space. The coordinated transmissions to the stations may be early terminated (e.g., have different lengths), as described herein. Early PPDU termination may be beneficial since resources may be shared between multiple APs. In some cases, resource decisions may be made by one AP on behalf of other APs. For example, the trigger frame described herein (e.g., indicating stations that may early terminate and allocating resources) may be transmitted by one AP on behalf of and to the stations of one or more other APs.

Figure 4A:
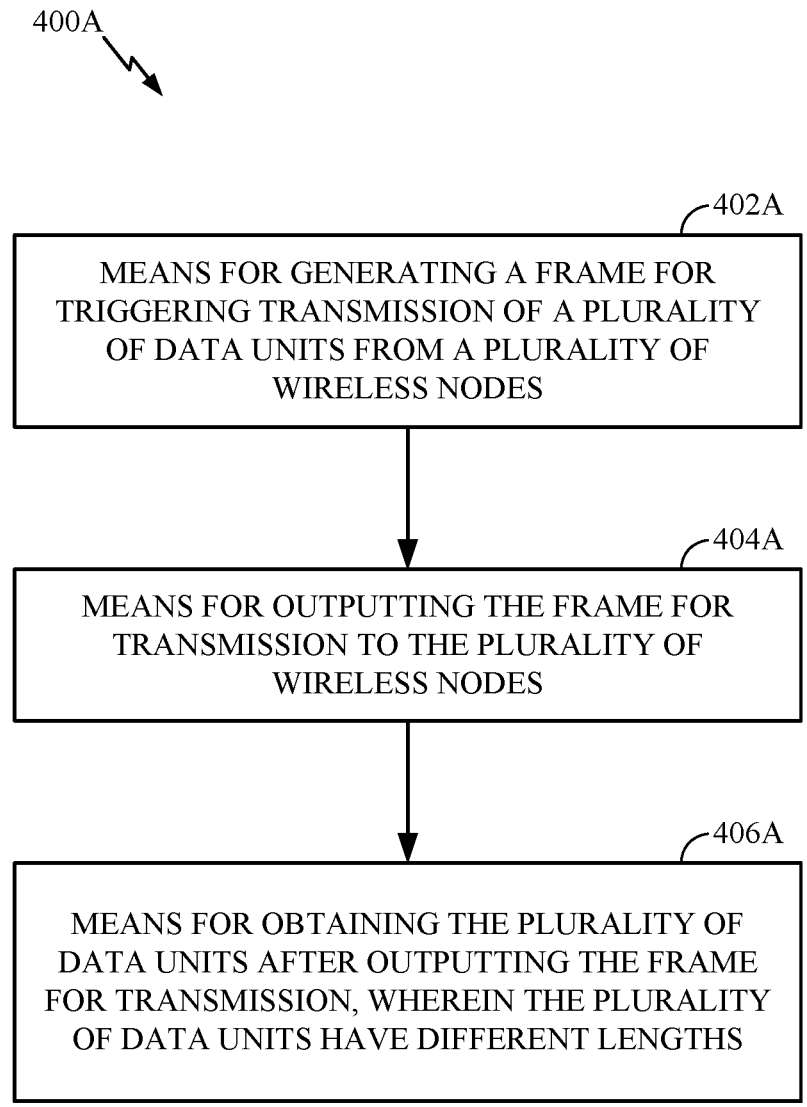
FIG. 4A illustrates example components capable of performing the operations shown in FIG. 4.
Figure 5A:
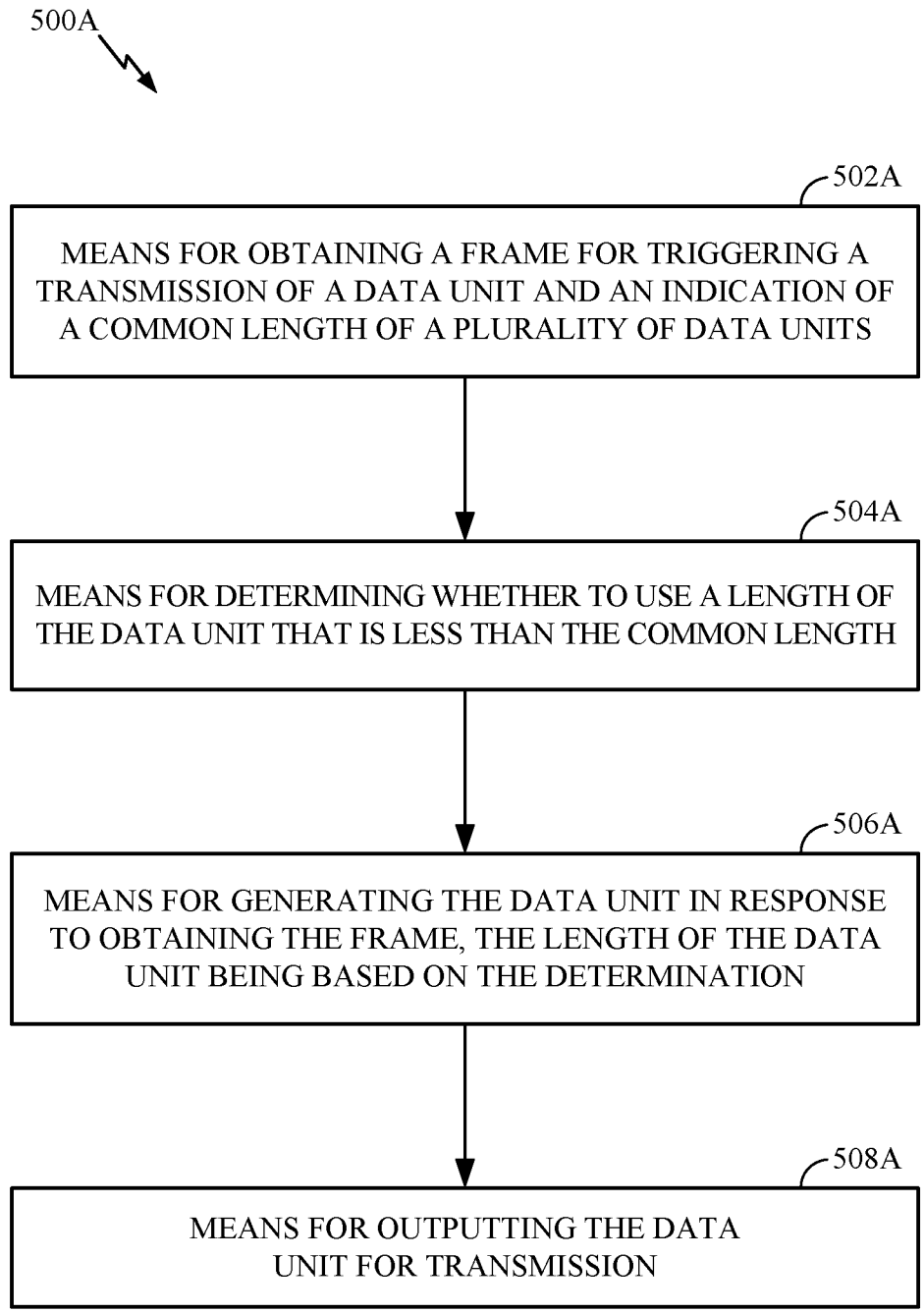
FIG. 5A illustrates example components capable of performing the operations shown in FIG. 5.
Figure 7A:
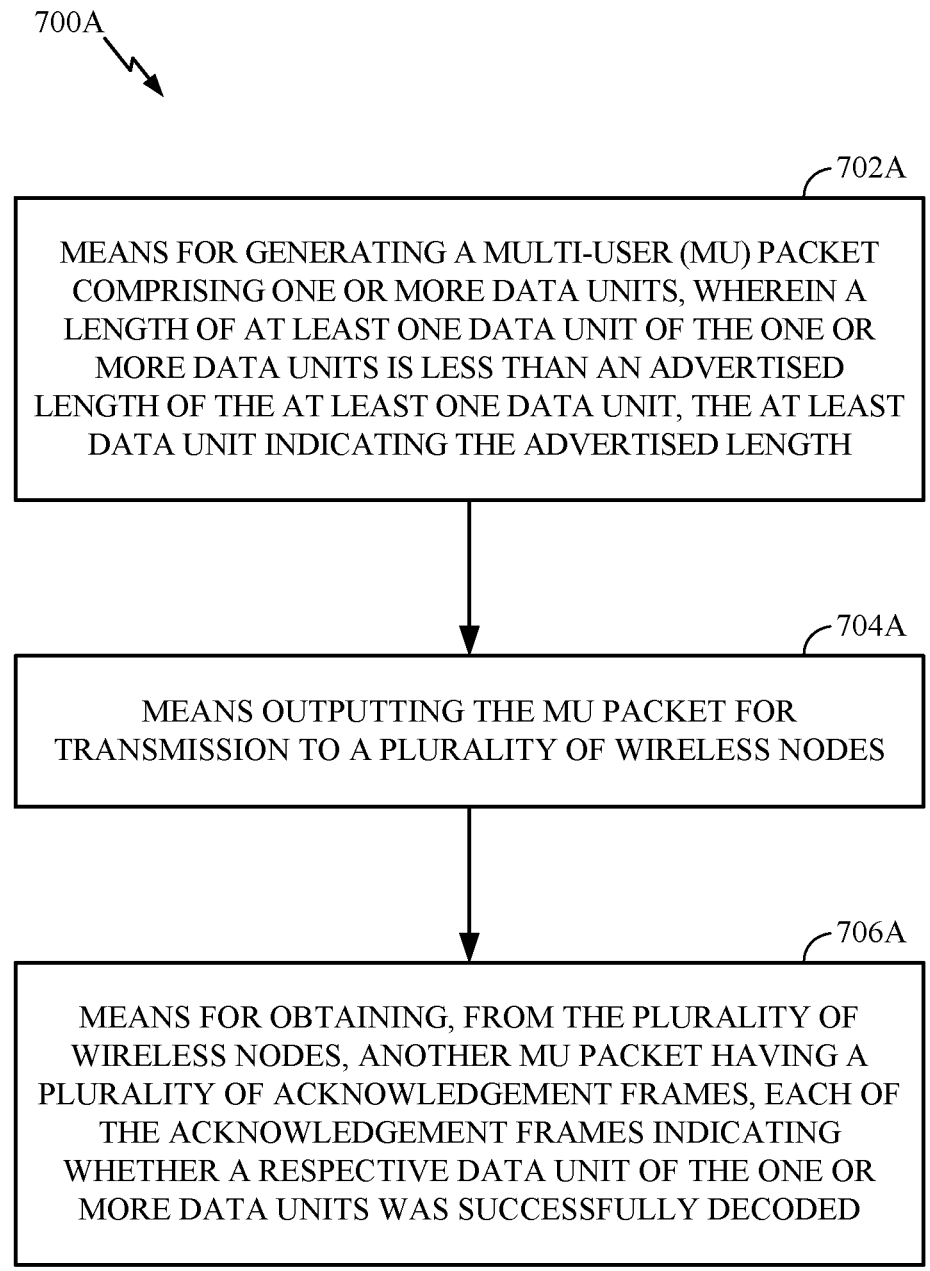
FIG. 7A illustrates example components capable of performing the operations shown in FIG. 7.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 400, 500, 700 illustrated in FIGS. 4, 5, and 7 correspond to means 400A illustrated in FIG. 4A, means 500A illustrated in FIG. 5A, and means 700A illustrated in FIG. 7A, respectively.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception. In some cases, the interface to output a frame for transmission and the interface to obtain a frame (which may be referred to as first and second interfaces herein) may be the same interface.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a station 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. In certain aspects, the computer program product may include packaging material.

Further, it should be appreciated that modules and/or other appropriate means for performing the methods and techniques described herein can be downloaded and/or otherwise obtained by a station and/or access point as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a station and/or access point can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communication, comprising:
a processing system configured to generate at least one frame for triggering transmission of one or more data units from one or more wireless nodes, the at least one frame comprising:
one or more first indications that one or more respective wireless nodes of the one or more wireless nodes are allowed to indicate a length of a respective data unit of the one or more data units to be less than a common length;
a first interface configured to output the at least one frame for transmission to the one or more wireless nodes; and
a second interface configured to obtain the one or more data units after outputting the at least one frame for transmission.

2. The apparatus of claim 1, wherein the at least one frame further comprises a second indication of the common length for each data unit of the one or more data units.

3. The apparatus of claim 1, wherein:
each data unit of the one or more data units comprises an indication of an end of the data unit;
the processing system is further configured to decode each data unit in response to the indication of the end of the data unit and generate an acknowledgement frame, the acknowledgment frame indicating whether the one or more data units have been successfully decoded by the apparatus; and
the first interface is configured to output the acknowledgement frame for transmission.

4. The apparatus of claim 1, wherein the processing system is configured to select the one or more wireless nodes based on whether each of the one or more wireless nodes is configured to transmit the respective data unit using a channel assigned for communication by non-legacy nodes.

5. The apparatus of claim 1, wherein:
the second interface is configured to obtain a third indication of a characteristic of each of the one or more wireless nodes; and
the processing system is configured to determine whether each of the one or more wireless nodes are allowed to indicate the length of the respective data unit to be less than the common length based on the characteristics of the one or more wireless nodes.

6. The apparatus of claim 1, wherein the processing system is configured to determine whether each of the one or more wireless nodes are allowed to indicate the length of the respective data unit to be less than the common length based on a receive power requirement of the apparatus.

7. The apparatus of claim 1, wherein the at least one frame comprises an indication of a receive power requirement of the apparatus unless the at least one frame allows a station to early terminate.

8. The apparatus of claim 7, wherein the indication of the receive power requirement comprises a target receive signal strength indicator (RSSI) for each of the one or more wireless nodes and an indication of a power drop from a sum of the target RSSIs tolerable by the apparatus.

9. The apparatus of claim 1, wherein:
the second interface is configured to obtain a clear to send (CTS) frame in response to a multi-user (MU) request to send (RTS) trigger frame, wherein the processing system is configured to generate the at least one frame after obtaining the CTS frame.

10. The apparatus of claim 1, wherein each data unit of the one or more data units comprises a data unit length indication, a length of the data unit being different from the data unit length indication.

11. The apparatus of claim 1, further comprising at least one antenna, wherein the at least one frame is outputted for transmission via the at least one antenna, and wherein the one or more data units are obtained via the at least one antenna, and wherein the apparatus is configured as an access point (AP).

12. The apparatus of claim 1, wherein:
the processing system is configured to determine whether each of the one or more wireless nodes are allowed to indicate the length of the respective data unit to be less than the common length based on the one or more first indications; and
the first interface is configured to output for transmission a third indication of whether each of one or more wireless nodes are allowed to indicate the length of the respective data unit of the one or more data units to be less than the common length based on the determination.

13. The apparatus of claim 12, wherein the determination of whether each of the one or more wireless nodes are allowed to indicate the length of the respective data unit to be less than the common length comprises grouping one or more first wireless nodes of the one or more wireless nodes that support indicating the length of the respective data unit to be less than the common length with one or more second wireless nodes of the one or more wireless nodes that do not support indicating the length of the respective data unit to be less than the common length.

14. The apparatus of claim 1, wherein the second interface is configured to obtain, prior to outputting the at least one frame for transmission, an indication, from each wireless node of the one or more wireless nodes, of a maximum duration of a respective data unit for each of the one or more data units.

15. The apparatus of claim 1, wherein:
the processing system is further configured to decode each data unit and generate an acknowledgement frame, the acknowledgment frame indicating whether the one or more data units have been successfully decoded by the apparatus;
the first interface is configured to output the acknowledgement frame for transmission; and
the first interface is configured to output for transmission an indication allocating available resources for communication by another wireless node, the available resources being between an end of a data unit of the one or more data units and a beginning of the acknowledgement frame.

16. The apparatus of claim 15, wherein the at least one frame for triggering transmission comprises the indication allocating the available resources for communication by the other wireless node.

17. The apparatus of claim 15, wherein the indication allocating the available resources comprises indicating that the other wireless node is to decode a last symbol of the data unit prior to the communication.

18. The apparatus of claim 15, wherein the data unit comprises a post-amble to be decoded by the other wireless node prior to the communication.

19. An apparatus for wireless communication, comprising:
a first interface configured to obtain at least one frame for triggering a transmission of a data unit;
a processing system configured to:
determine whether to use a length of the data unit that is less than a common length; and
generate the data unit in response to obtaining the at least one frame, the length of the data unit being based on the determination; and
a second interface configured to output the data unit for transmission.

20. The apparatus of claim 19, wherein the at least one frame comprises:
one or more first indications that the apparatus is allowed to indicate that the length of the data unit is less than the common length, or
one or more second indications of the common length for the data unit.

* * * * *